(12) United States Patent
Ikuma et al.

(10) Patent No.: US 12,222,567 B2
(45) Date of Patent: Feb. 11, 2025

(54) OPTICAL CIRCUIT MODULE

(71) Applicant: Nippon Telegraph and Telephone Corporation, Tokyo (JP)

(72) Inventors: Yuichiro Ikuma, Musashino (JP); Yusuke Nasu, Musashino (JP); Takashi Yamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 248 days.

(21) Appl. No.: 17/778,253

(22) PCT Filed: Nov. 28, 2019

(86) PCT No.: PCT/JP2019/046639
§ 371 (c)(1),
(2) Date: May 19, 2022

(87) PCT Pub. No.: WO2021/106164
PCT Pub. Date: Jun. 3, 2021

(65) Prior Publication Data
US 2022/0404567 A1     Dec. 22, 2022

(51) Int. Cl.
*G02B 6/42*      (2006.01)
(52) U.S. Cl.
CPC ......... *G02B 6/4243* (2013.01); *G02B 6/4249* (2013.01)

(58) Field of Classification Search
CPC .......................... G02B 6/4243; G02B 6/4249
USPC .......................................................... 385/52
See application file for complete search history.

(56) References Cited

U.S. PATENT DOCUMENTS

| | | | |
|---|---|---|---|
| 5,513,290 A | 4/1996 | Ishikawa et al. | |
| 2003/0103729 A1* | 6/2003 | Ishida | G02B 6/30 385/137 |

FOREIGN PATENT DOCUMENTS

| | | |
|---|---|---|
| JP | 2001-228345 A | 8/2001 |
| JP | 2002-107564 A | 4/2002 |
| JP | 2014-102386 A | 6/2014 |

* cited by examiner

*Primary Examiner* — Jerry M Blevins
(74) *Attorney, Agent, or Firm* — Workman Nydegger (57) ABSTRACT

An optical circuit module in which an optical fiber array and an optical circuit substrate are connected, the optical fiber array including a groove substrate in which a groove for optical fiber alignment is formed, a pressing plate stacked on and bonded to the groove substrate, and an optical fiber bonded to and fixed in the groove of the groove substrate, and the optical circuit substrate including an input/output waveguide. In a connection surface of the optical circuit module, an area of a common portion in a cross section of the optical circuit substrate and the pressing plate is larger than an area of a common portion in a cross section of the optical circuit substrate and the groove substrate.

6 Claims, 6 Drawing Sheets

OPTICAL CIRCUIT MODULE

TECHNICAL FIELD

The present invention relates to an optical circuit module including an optical fiber fixing structure in which an optical fiber array and an optical circuit chip (a silicon photonics (SiP) circuit chip). In the optical fiber fixing structure, a plurality of optical fibers are arranged and disposed. On SiP circuit chip, an input/output waveguide is formed.

BACKGROUND ART

Smaller and more advanced optical modules have been actively researched and developed to increase a communication capacity per device of optical communication devices. Examples of promising technologies for this purpose include silicon photonics (SiP) technology.

SiP technology is a technique for optical circuits using silicon (Si) as a core material and silica glass ($SiO_2$) as a cladding material. Hereinafter, the optical waveguide of an optical circuit is referred to as a Si waveguide and the entire optical circuit chip is referred to as a SiP circuit. Because the Si waveguide has a large refractive index contrast between a core and a cladding, a cross-sectional area of the waveguide and a minimum bending radius can be made significantly smaller than that of optical circuits formed of other materials, which enables high density integrated optical circuits.

Figure 1:
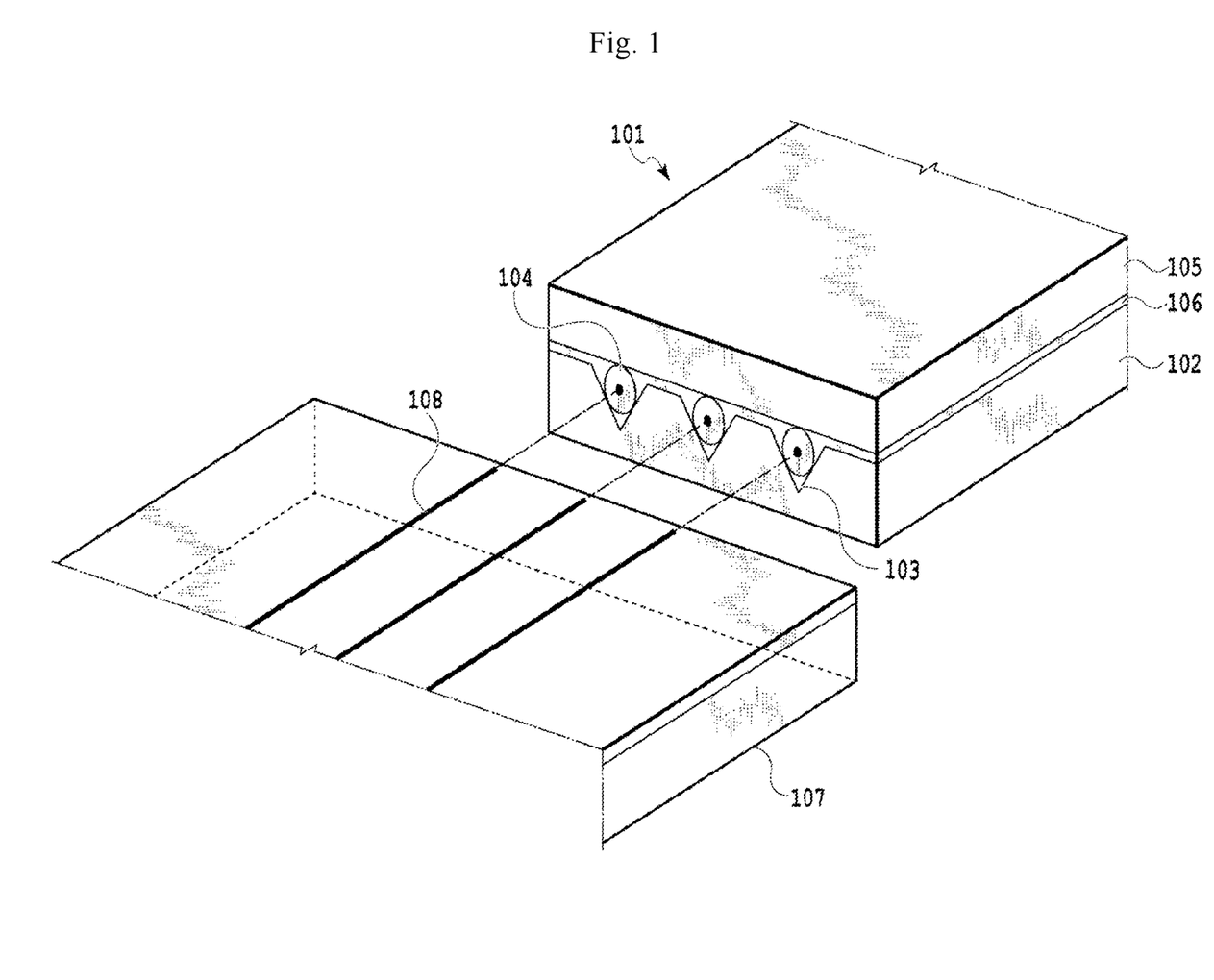
FIG. 1 is a schematic diagram of a known optical circuit module structure which connects a SiP circuit to a fiber array.

In order to actually modularize and make the SiP circuit usable, it is necessary to bundle a plurality of optical fibers for input/output as an optical fiber array and to connect and fix it to an end surface of the optical waveguide of the SiP circuit. FIG. 1 shows a schematic diagram of an optical fiber fixing structure of a known optical circuit module in which a SiP circuit and an optical fiber array are connected.

In FIG. 1, a fiber array 101 is fabricated by aligning a plurality of optical fibers 104 with grooves in a groove substrate 102 in which a plurality of grooves 103 having, for example, a substantially V-shaped cross section are formed in parallel at predetermined core intervals in a substrate surface, pressing the plurality of optical fibers 104 from above with a pressing plate 105 and fixing them with an adhesive 106 or the like.

A SiP circuit 107 is an optical circuit optically coupled and connected to the fiber array 101 and has a plurality of Si waveguides 108 near a surface of the SiP circuit as input/output waveguides for transmitting and receiving optical signals in correspondence with the optical fibers 104.

The SiP circuit 107 is bonded to the fiber array 101 with an optical adhesive or the like having a high transmittance for light in a communication wavelength band, and a core end surface of each of the Si waveguides 108 is disposed so that an optical axis thereof is aligned with a core end surface of each of the optical fibers 104 of the fiber array 101, and is optically coupled thereto.

Accuracy required for optical axis alignment at a connection portion between the SiP circuit 107 and the fiber array 101 depends on a mode field diameter (MFD: an index representing the spread of optical power distribution in a cross section of a light beam) of the light at the connection portion. As the MFD becomes smaller, the deterioration of connection loss with respect to the same optical axis misalignment increases, and thus the required accuracy becomes more severe.

Figure 2:
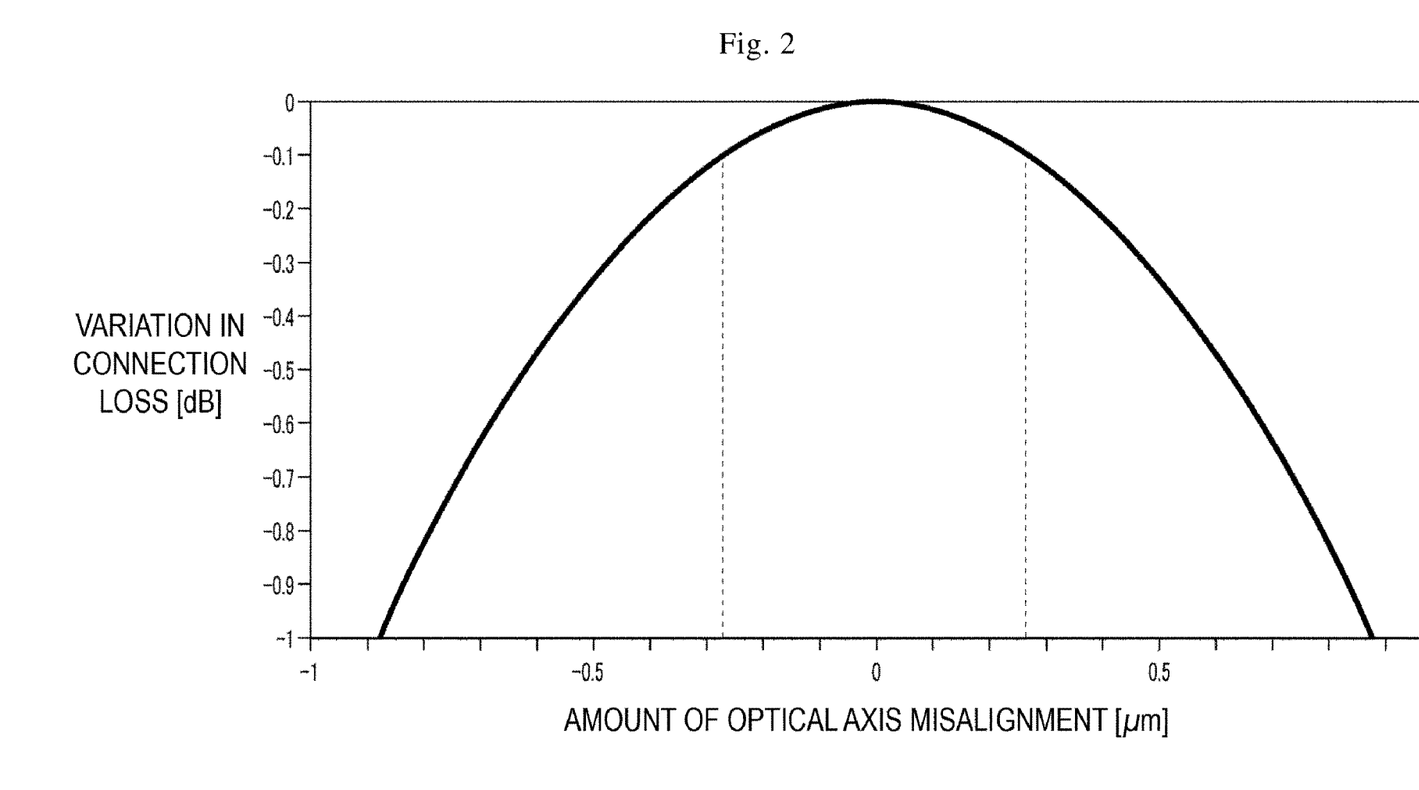
FIG. 2 is a graph showing a variation in connection loss with respect to an amount of misalignment of an optical axis between cores.

FIG. 2 is a graph showing an example of a variation in a connection loss with respect to an amount of optical axis misalignment between the Si waveguide 108 and the core of the optical fiber 104. A horizontal axis in FIG. 2 is the amount of optical axis misalignment (μm), and a vertical axis is the variation in the connection loss (dB) corresponding to the amount of optical axis misalignment. From FIG. 2, it can be understood that the amount of misalignment has to be 0.28 μm or less to curb the variation in the connection loss to within 0.1 dB.

CITATION LIST

Patent Literature

PTL 1: JP 2001-228345 A

SUMMARY OF THE INVENTION

Technical Problem

However, the present inventors have found that even when the alignment between the core of the optical fiber and the Si waveguide can be performed with high accuracy, there are the following problems.

FIGS. 3(a) and 3(b) are cross-sectional views of an optical fiber fixing structure in which a connection portion between a fiber array 101 and a SiP circuit 107 in a known optical circuit module structure illustrating the problems when seen from the SiP circuit 107 side in a direction of an optical axis.

Figure 3:
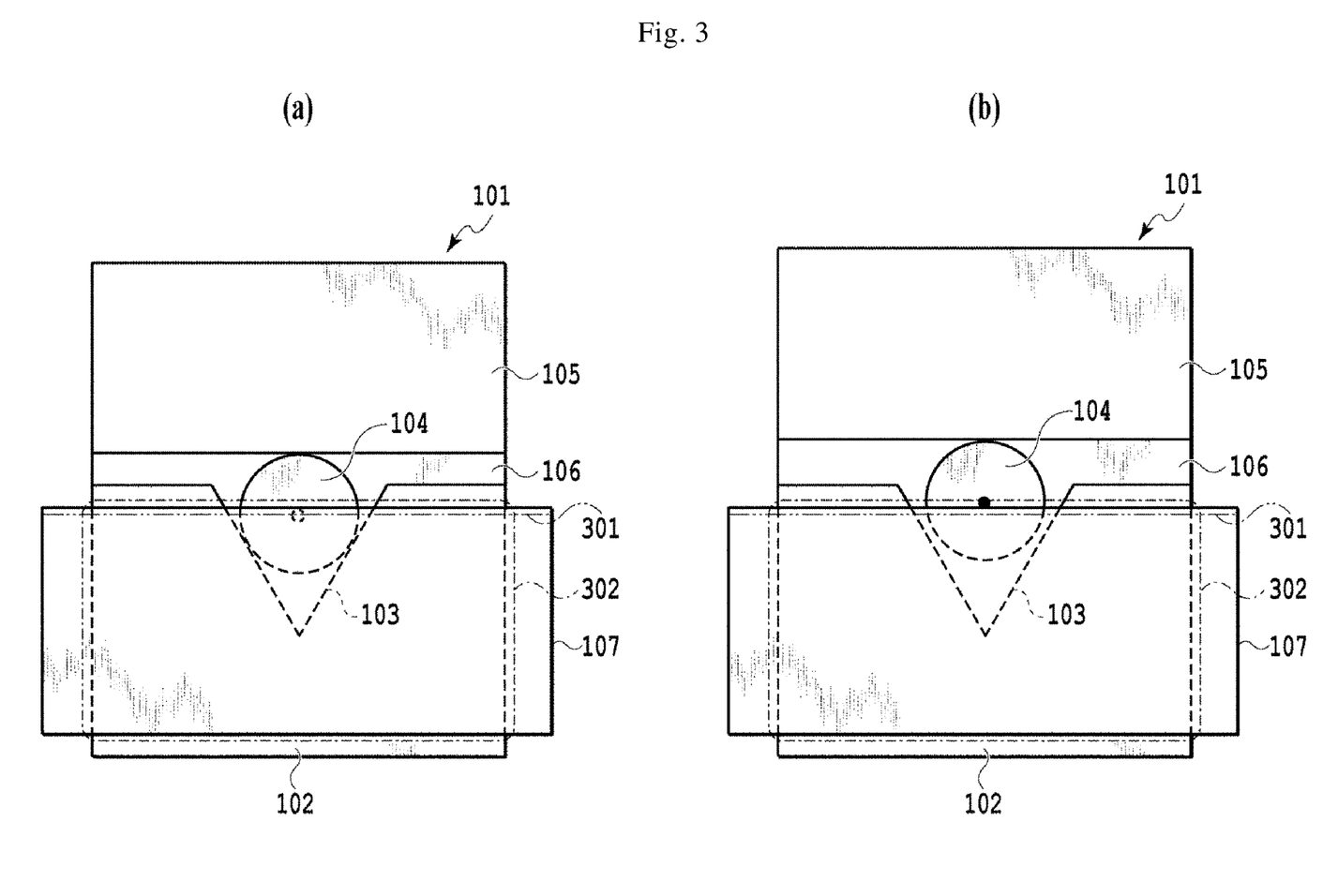
FIG. 3 is a set of cross-sectional views (a) and (b) of a connection portion of the known optical circuit module structure.

In FIG. 3, only one optical fiber 104 is illustrated for simplicity, and a substrate cross-section of the SiP circuit 107 is illustrated on the front side, and the end surface of the fiber array 101 is illustrated on the back side so that they overlap each other as a perspective view. In FIG. 3, note that an adhesive 106 which bonds a pressing plate 105, a groove substrate 102, and the optical fiber 104 of the fiber array 101 is filled to a space between the optical fiber 104 and a groove 103 below the optical fiber 104.

A two-dot dashed line 301 shows a position of the core in a Si waveguide 108 at a depth in the substrate cross section of the SiP circuit 107, and passes through the position of the core of the optical fiber 104 in a state in which there is no misalignment in FIG. 3(a). The core of the Si waveguide 108 not shown in FIG. 3 coincides with the position of the core of the optical fiber 104 in the state in which there is no misalignment in FIG. 3(a).

In the SiP circuit 107, because the Si waveguide 108 is located at a position very close to a substrate surface of the SiP circuit 107, which is at most within 10 μm, generally about 4 μm, from a substrate surface of the SiP circuit 107, the circuit surface does not reach an upper end of a cross section of an optical fiber.

Thus, when the fiber array 101 and the SiP circuit 107 are bonded by an optical adhesive 302, a region over which the optical adhesive 302 spreads is within a region 302 indicated by an alternated long and short dash line in FIG. 3. Even considering a fillet portion formed by the optical adhesive 302 protruding out, it is conceivable that the SiP circuit 107 is fixed substantially to the groove substrate 102 and is not fixed to a pressing plate 105.

Here, in FIG. 3(b), an effect of thermal expansion of the adhesive 106 in the fiber array 101 when a temperature of the connection portion changes will be described. The SiP circuit 107 is bonded to the groove substrate 102 by the optical adhesive 302, and a relative positional relationship between them does not change. Thus, due to expansion of the adhesive 106 in a portion confined between the groove 103 of the groove substrate 102 and the optical fiber 104, the optical fiber 104 is caused to rise from the groove substrate 102, and misalignment between a core of the optical fiber 104 and a core of the Si waveguide 108 occurs. Thus, unfortunately, connection loss increases.

In FIG. 3(*b*), for example, assuming that an opening angle of the groove 103 is 60 degrees and an outer diameter of the optical fiber 104 is 125 μm, a distance from a lower end of the optical fiber to a lower end of the groove is exactly equal to a radius of the optical fiber and is 62.5 μm. Assuming that an epoxy-based adhesive is used as the adhesive 106 and a linear expansion rate thereof is $8\times10^{-5}$ [$K^{-1}$], a variation in the core position is 0.45 μm for a temperature change from −5 to 85° C. which is a general operating temperature range, that is, a temperature change of 90° C., and this causes a variation in the connection loss of 0.26 dB from FIG. 2 which cannot be ignored.

Cited PTL 1 describes a structure in which a plate-covered glass for polishing reinforcement is bonded onto a silica planar lightwave circuit (PLC) which is an optical circuit containing silica glass as a main component. This is a commonly used structure for silica PLC today, and it is conceivable that this structure not only helps to reinforce during polishing, but also contributes to suppression of the optical axis misalignment because the entire surface of the fiber array including the pressing plate and the optical circuit are adhered to each other.

However, in the case of the SiP circuit 107, a circuit size is several millimeters square which is smaller than that of the silica PLC, and thus it is difficult to bond such a reinforcing glass plate to only a connection portion with the fiber array 101. In addition, in the SiP circuit 107, an electrode for driving a circuit element such as a modulator needs to be exposed on the surface thereof, and thus it is not possible to cover a chip surface with the reinforcing glass plate. In such circumstances, it is difficult to apply this structure to the SiP circuit 107.

In other words, because the SiP circuit 107 has a peculiar circumstance that only the groove substrate 102 is bonded and fixed in addition to the connection loss being sensitive to misalignment, the connection loss unfortunately increases and worsens due to the thermal expansion of the adhesive in the groove occurs.

The present invention has been made in view of such problems, and an object thereof is to provide an optical circuit module in an optical circuit module structure which connects an optical fiber array to a SiP circuit having an optical waveguide and is capable of suppressing misalignment between the optical waveguide and a core of an optical fiber when temperature varies and reducing temperature dependency of connection loss.

Means for Solving the Problem

Examples of embodiments of the present invention include the following configurations to achieve the above object.

Configuration 1

An optical circuit module including:
an optical fiber fixing structure in which an optical fiber array and an optical circuit substrate are connected, the optical fiber array including a groove substrate in which a groove for optical fiber alignment is formed, a pressing plate stacked on and bonded to the groove substrate, and an optical fiber bonded to and fixed in the groove of the groove substrate, and the optical circuit substrate including an input/output waveguide, wherein, in a connection surface of the optical circuit module, an area of a common portion in a cross section of the optical circuit substrate and the pressing plate when seen in a direction of an optical axis is larger than an area of a common portion in a cross section of the optical circuit substrate and the groove substrate when seen in the direction of the optical axis.

Configuration 2

The optical circuit module of Configuration 1, wherein the pressing plate of the optical fiber array is disposed on a substrate end surface side below a waveguide layer of the optical circuit substrate, the groove substrate is disposed on the pressing plate with an opening portion of a groove facing a side of the pressing plate and is bonded by an adhesive with the optical fiber interposed therebetween, and an end surface of the optical circuit substrate is bonded to the pressing plate of the optical fiber array with an optical adhesive.

Configuration 3

The optical circuit module of Configuration 1, wherein an area of the common portion of the optical circuit substrate and the groove substrate is zero.

Configuration 4

The optical circuit module of Configuration 1, wherein a groove width of the groove substrate is narrow so that a core of the optical fiber is exposed from the groove.

Configuration 5

The optical circuit module according to any one of Configurations 1 to 4, wherein a core material of the input/output waveguide is silicon.

Configuration 6

The optical circuit module according to any one of Configurations 1 to 5, wherein a depth from a surface of the optical circuit substrate to the input/output waveguide is less than 10 μm.

Effects of the Invention

According to the present invention described above, it is possible to provide an optical circuit module which connects an optical fiber array to a SiP circuit having an optical waveguide and is capable of suppressing misalignment between the optical waveguide and a core of an optical fiber when a temperature varies and reducing temperature dependency of connection loss.

DESCRIPTION OF EMBODIMENTS

Hereinafter, embodiments of the present invention will be described with reference to the accompanying drawings. Using optical fibers with different outer diameters, changing a material of a substrate, and changing a type of adhesive are within the scope of ordinary design changes, and the present invention is not limited by these.

Embodiment 1

Figure 4:
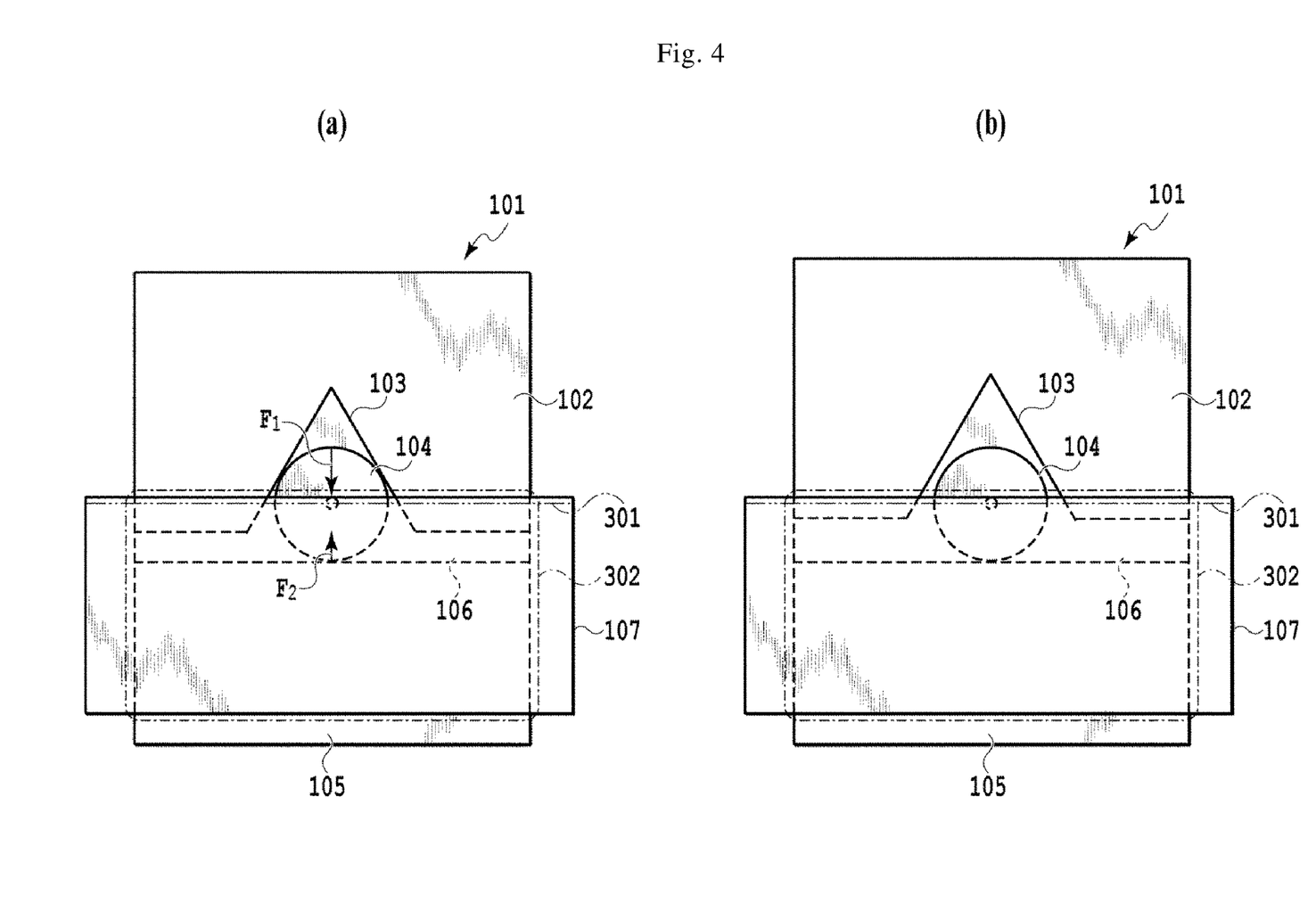
FIG. 4 is a cross-sectional view of a connection portion of an optical circuit module of Embodiment 1 of the present invention.

FIG. 4 is a cross-sectional view of an optical circuit module structure of a connection portion of an optical circuit module of Embodiment 1 of the present invention.

As shown in FIG. 4(a), in the optical circuit module of the present invention, a fiber array 101 is disposed upside down compared to the example of known art (FIG. 3). That is, when seen from a SiP circuit 107 side in a direction of an optical axis, a pressing plate 105 of the fiber array 101 is disposed on the substrate end surface side below a waveguide layer 301 of the SiP circuit 107, and a groove substrate 102 is disposed on the pressing plate 105 so that an opening portion of the groove 103 faces the pressing plate 105 side (downward), and is bonded by an adhesive 106 with an optical fiber 104 interposed therebetween.

The fiber array 101 and the SiP circuit 107 are bonded by an optical adhesive 302, as in the known art, and a core of the optical fiber 104 is disposed and bonded to a core of the waveguide layer 301 of the SiP circuit 107 so that the optical axes thereof are aligned with each other to form an optical coupling. However, in the present invention, an end surface of the SiP circuit 107 is different from that in the known art in that it is mainly bonded to the pressing plate 105 of the fiber array 101 by the optical adhesive 302.

In this way, as is clear from FIG. 4(a), an adhesive area to which the SiP circuit 107 and the pressing plate 105 are bonded is much larger than an adhesive area to which the SiP circuit 107 and the groove substrate 102 are bonded.

That is, in a connection surface of an optical circuit module having an optical fiber fixing structure in which an optical circuit substrate and an optical fiber array including a groove substrate in which a groove for optical fiber alignment is formed, a pressing plate stacked on and bonded to the groove substrate, and an optical fiber bonded and fixed into the groove of the groove substrate are connected, an area of a common portion between the optical circuit substrate and the pressing plate is larger than an area of a common portion between the optical circuit substrate and the groove substrate (an overlapping portion in a cross section seen in a direction of an optical axis).

In such an optical fiber fixing structure, when a temperature of the connection portion of the optical circuit module changes and the adhesive 106 in the fiber array 101 thermally expands, as shown in FIG. 4(b), the pressing plate 105 having a large bonding area with the SiP substrate 107 has almost no movement with respect to the SiP circuit 107, and the groove substrate 102 having a small bonding area expands in a raised form in an upward direction in the drawing.

As shown in FIG. 4(a), the expansion of the adhesive 106 between the optical fiber 104 and the groove 103 thereabove exerts a downward force $F_1$ on the optical fiber 104. On the other hand, the expansion of the adhesive 106 between the optical fiber 104 and the pressing plate 105 also exerts a force $F_2$ on the optical fiber 104, but this is mostly cancelled by a resultant force of forces applied from both sides, and because a thickness of an adhesive layer directly under the optical fiber 104 is thin, an amount of expansion is small, and an upward component $F_2$ of the resultant force is much smaller than that of $F_1$. Thus, the optical fiber 104 is pressed against the pressing plate 105, and a change in a relative position between the optical fiber 104 and the SiP circuit 107 is extremely small.

As a result, the change in the relative position between the Si waveguide 108 and the core of the optical fiber 104 when the adhesive 106 expands is also extremely small, and a variation in connection loss is greatly suppressed.

Temperature Characteristics of Connection Loss

Figure 5:
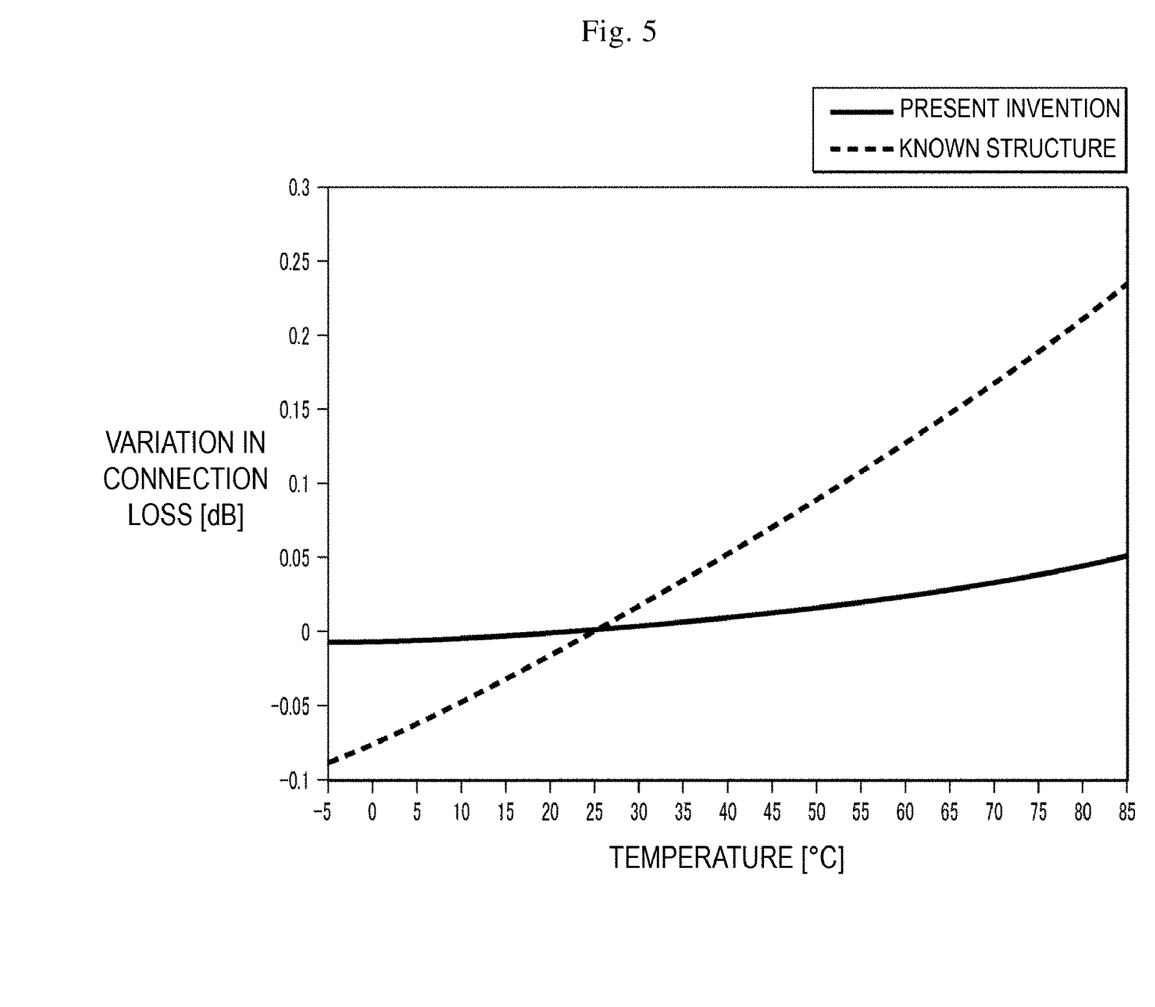
FIG. 5 is a graph comparably showing a variation in connection loss with respect to temperature in each of the optical circuit modules of the present invention and the known structure.

FIG. 5 is a graph of temperature characteristics of connection loss measured in each of the connection structure of the known optical circuit module shown in FIG. 3 and the connection structure of the optical circuit module of the present invention shown in FIG. 4. It was confirmed that the variation in the connection loss (a vertical axis dB) when the temperature was changed from −5° C. to 85° C. on a horizontal axis was 0.32 dB in the structure of known art, whereas it was only 0.06 dB in the structure of the present invention, and the present invention significantly reduced temperature dependency of the connection loss.

Embodiment 2

Figure 6:
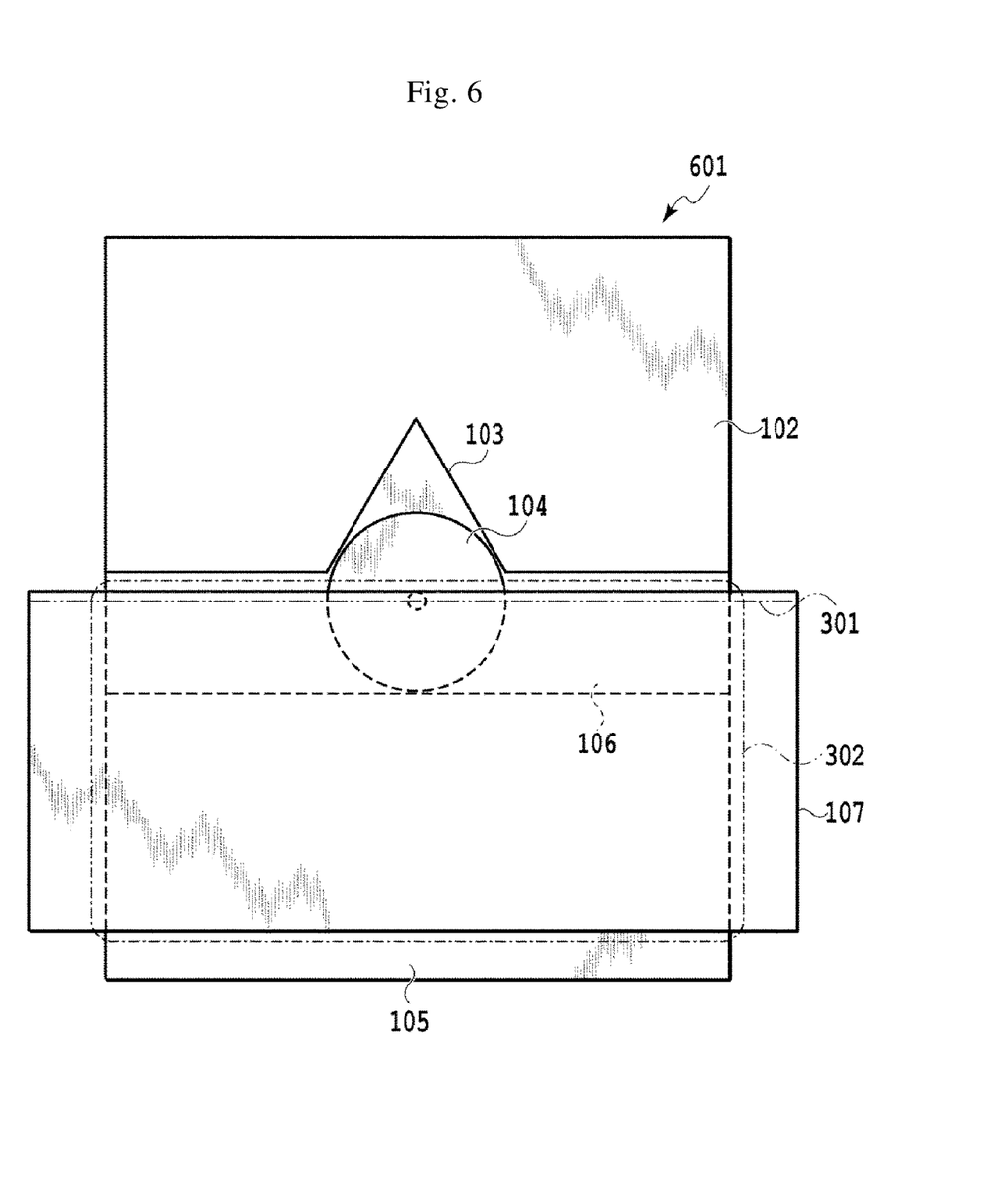
FIG. 6 is a cross-sectional view of a connection portion of an optical circuit module of Embodiment 2 of the present invention.

FIG. 6 is a cross-sectional view of a connection portion of an optical circuit module of Embodiment 2 of the present invention.

In Embodiment 1, although the SiP circuit 107 is also slightly bonded to the groove substrate 102 of the fiber array by the optical adhesive 302, the groove substrate 102 and the SiP circuit 107 are preferably not bonded at all in order not to cause the change in the relative position between the pressing plate 105 and the SiP circuit 107. It is the structure of Embodiment 2 which enables this.

The optical circuit module of Embodiment 2 of FIG. 6 is different from Embodiment 1 in that a width of the groove 103 of the groove substrate 102 is narrow so that the core of the optical fiber 104 is exposed from the groove. When a fiber array 601 is connected to the SiP circuit 107, a common portion of the groove substrate 102 and the SiP circuit 107 (an overlapping portion in a cross section seen in the direction of the optical axis) can be eliminated (an area of the common portion can be zero) using such a groove substrate 102.

In this way, the optical adhesive 302 can prevent the SiP circuit 107 and the groove substrate 102 from being bonded to each other, and even when the adhesive 106 on the fiber array 601 side thermally expands, the relative position between the pressing plate 105 and the SiP circuit 107 does not change at all, and the temperature dependency of the connection loss can be suppressed more than in Embodiment 1.

INDUSTRIAL APPLICABILITY

As described above, according to the optical circuit module of the present invention, it is possible to provide an optical circuit module which can suppress misalignment between the optical waveguide of the SiP circuit and the core of the optical fiber when temperature varies and can reduce the temperature dependency of the connection loss.

The invention claimed is:
1. An optical circuit module comprising:
an optical fiber fixing structure in which an optical fiber array and an optical circuit substrate are connected, the optical fiber array including a groove substrate in which a groove for optical fiber alignment is formed, a pressing plate stacked on and bonded to the groove substrate, and an optical fiber bonded to and fixed in the groove of the groove substrate, and the optical circuit substrate including an input/output waveguide, wherein, in a connection surface of the optical circuit module, an area of a common portion in a cross section of the optical circuit substrate and the pressing plate when seen in a direction of an optical axis is larger than an area of a common portion in a cross section of the optical circuit substrate and the groove substrate when seen in the direction of the optical axis.

2. The optical circuit module according to claim 1, wherein the pressing plate of the optical fiber array is disposed on a substrate end surface side below a waveguide layer of the optical circuit substrate, the groove substrate is disposed on the pressing plate with an opening portion of a groove facing a side of the pressing plate and is bonded by an adhesive with the optical fiber interposed therebetween, and an end surface of the optical circuit substrate is bonded to the pressing plate of the optical fiber array with an optical adhesive.

3. The optical circuit module according to claim 1, wherein an area of the common portion of the optical circuit substrate and the groove substrate is zero.

4. The optical circuit module according to claim 1, wherein a groove width of the groove substrate is narrow so that a core of the optical fiber is exposed from the groove.

5. The optical circuit module according to claim 1, wherein a core material of the input/output waveguide is silicon.

6. The optical circuit module according to claim 1, wherein a depth from a surface of the optical circuit substrate to the input/output waveguide is less than 10 μm.

* * * * *